(No Model.)
H. W. GREMMELS.
DEVICE FOR SCALING FISH.
No. 572,982. Patented Dec. 15, 1896.
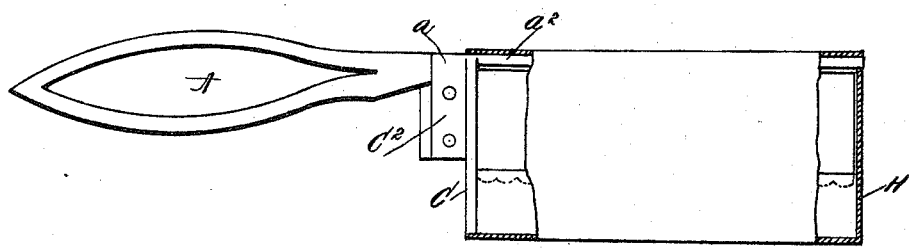
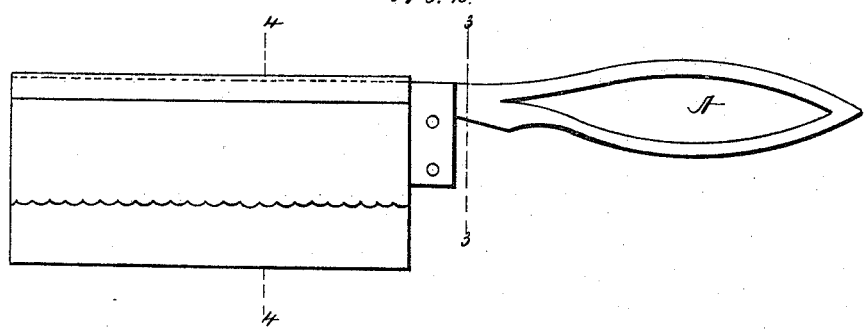
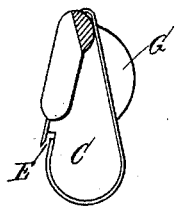 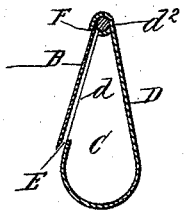 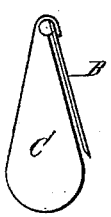
WITNESSES:
John Buckler,
C Gerst
INVENTOR
Henry W. Gremmels,
BY
Edgar Tate
ATTORNEYS.

UNITED STATES PATENT OFFICE.

HENRY WILLIAM GREMMELS, OF DENVER, COLORADO.

DEVICE FOR SCALING FISH.

SPECIFICATION forming part of Letters Patent No. 572,982, dated December 15, 1896.

Application filed April 15, 1896. Serial No. 587,628. (No model.)

*To all whom it may concern:*

Be it known that I, HENRY WILLIAM GREMMELS, a citizen of the United States, and a resident of Denver, in the county of Arapahoe and State of Colorado, have invented certain new and useful Improvements in Devices for Scaling Fish, of which the following is a specification, reference being had to the accompanying drawings, forming a part thereof, in which similar letters of reference indicate corresponding parts.

This invention relates to devices for scaling fish, and the object thereof is to provide an improved device of this class which is simple in construction and operation and which is comparatively inexpensive.

The invention is fully disclosed in the following specification, of which the accompanying drawings form a part, in which—

Figure 1 is a side view of my improved fish-scaling device, parts thereof being shown in section; Fig. 2, a similar view of the opposite side thereof; Fig. 3, a transverse section on the line 3 3 of Fig. 2; Fig. 4, a similar section on the line 4 4 of Fig. 2, and Fig. 5 an end view thereof.

In the practice of my invention I provide a handle A, which may be of any desired form, and to which is secured a transverse shoulder $a$, from which projects a strong wire or rod $a^2$, and secured to said wire or rod and said shoulder is a blade B, which is rectangular in form and the edge of which is provided with notches or recesses, as shown in dotted lines in Fig. 1, and formed on the shoulder or head $a$, or secured thereto, is an outwardly-directed plate $c$, which is provided with a flange $C^2$, by which it is secured to said shoulder or head; and I also provide a casing D, which is of the form in cross-section shown in Fig. 4, and which is of the same length as the blade B, and which is provided at one side with a longitudinal opening $d$, and said casing is larger at its lower side than at its upper side, and at the upper side thereof is formed a longitudinal bore or passage $d^2$, into which the rod or wire $a$ is adapted to be inserted, and when said rod or wire $a$ is inserted into said longitudinal bore or passage $d^2$ the blade B will cover the opening $d$ in the side of the casing and project below the lower edge thereof, as shown at E in Figs. 3 and 4.

The longitudinal bore or passage $d^2$ is provided with a longitudinal opening at one side, as shown at F, through which the blade B projects, and the casing D is provided at the end adjacent to the handle with a projecting plate G, and when the casing D is in position the end thereof adjacent to the handle is closed by the plate C, and the outer end is closed as shown at H in Fig. 1.

It will be understood that the casing D may be detached from the handle and blade whenever desired by simply sliding the same off of the wire or rod $a^2$; and in practice, when it is desired to scale a fish, the casing is slid on said wire or rod $a^2$ in such manner that the blade B projects downwardly on the outside thereof and over the opening $d$, formed therein, as shown in Figs. 2, 3, and 4, and the device is grasped by the handle A and the casing is held onto the wire or rod $a^2$ by placing one of the fingers of the hand over the projecting plate or flange G, formed thereon, and the fish is scaled by passing the device over the same in the direction opposite to that in which the scales project in such manner that the edge of the blade passes under the scale, and in this operation the scales enter the casing D and will remain therein until said casing is detached from the handle, when they may be discharged from the opening $d$.

That side of the casing D in which the longitudinal bore or passage $d^2$ is formed is much narrower than the other, and the outer side thereof is elliptical in cross-section and projected beyond the edge of the blade B, and this construction facilitates the operation of the device.

This device is simple in construction and operation and perfectly adapted to accomplish the result for which it is intended, while being also comparatively inexpensive; and it is evident that changes in and modifications of the construction herein described may be made without departing from the spirit of my invention or sacrificing its advantages, and I reserve the right to make all such alterations therein and modifications thereof as fairly come within the scope of the invention.

Having fully described my invention, I claim as new and desire to secure by Letters Patent—

1. In a fish-scaler, the combination with a handle of a rod or wire secured thereto, a blade connected with said rod or wire, and a casing adapted to be detachably connected with said rod or wire, said casing being provided with a longitudinal opening in one side thereof, over which said blade projects, substantially as shown and described.

2. In a fish-scaler, the combination with a handle, provided with a rod or wire and a plate secured adjacent thereto, of an open-ended casing which is adapted to be connected with said wire or rod, and the end of which is closed by said plate, said casing being provided with an oblong opening in one side thereof, and said handle and said rod or wire being provided with a blade which projects over said opening, substantially as shown and described.

3. In a fish-scaler, the combination with a handle provided with a rod or wire, and a plate secured adjacent thereto, of an open-ended casing which is adapted to be slid onto said wire or rod, and the end of which is closed by said plate, said casing being provided with an oblong opening in one side thereof, and said handle and said rod or wire being provided with a blade which projects over said opening, the edge of said blade being provided with notches or recesses, and said casing at its outer side being elliptical in cross-section, and being so formed as to project below the edge of said blade, substantially as shown and described.

4. In a fish-scaler, the combination with a handle provided with a rod or wire, and a plate secured adjacent thereto, of an open-ended casing, which is adapted to be slid onto said wire or rod, and the end of which is closed by said plate, said casing being provided with an oblong opening in one side thereof, and said handle and said rod or wire being provided with a blade which projects over said opening the edge of said blade being provided with notches or recesses, and said casing at its outer side being elliptical in cross-section, and being so formed as to project below the edge of said blade, and said casing being also provided adjacent to the handle with a projection, or flange, by which it is held in position, substantially as shown and described.

5. In a fish-scaler, the combination with a handle, provided with a wire or rod, as $a^2$, and a blade as B, secured thereto, of a detachable casing as D, which is provided at one side with a longitudinal bore or passage into which said wire or rod is adapted to be inserted, in one side of which is formed a slot through which said blade passes, said casing being provided with an oblong opening in one side which is covered by said blade, and the side thereof opposite the longitudinal bore or passage, being elliptical in cross-section, and being projected below the edge of the blade, substantially as shown and described.

In testimony that I claim the foregoing as my invention I have signed my name, in presence of the subscribing witnesses, this 9th day of April, 1896.

HENRY WILLIAM GREMMELS.

Witnesses:
G. H. JOHNSON,
P. Z. TAYLOR.